Oct. 22, 1940.  A. J. RICHARDS  2,218,719

DRIVE MECHANISM FOR WINDSHIELD WIPERS

Filed Oct. 13, 1937  2 Sheets-Sheet 1

Inventor
Arthur J. Richards
By
Barthel & Barthel
Attorneys

Oct. 22, 1940.  A. J. RICHARDS  2,218,719

DRIVE MECHANISM FOR WINDSHIELD WIPERS

Filed Oct. 13, 1937  2 Sheets-Sheet 2

Inventor
Arthur J. Richards,
By
Attorneys

Patented Oct. 22, 1940

2,218,719

UNITED STATES PATENT OFFICE 2,218,719

DRIVE MECHANISM FOR WINDSHIELD WIPERS

Arthur J. Richards, Detroit, Mich.

Application October 13, 1937, Serial No. 168,729

3 Claims. (Cl. 121—48)

This invention relates to mechanism for imparting a to and from or oscillatory movement, and more particularly to means for driving a windshield wiper or other device having a similar movement.

An object of the invention is to provide a very compact device of simple construction which may be manufactured at limited cost and which device is particularly adapted for use upon motor vehicles employing internal combustion engines as the motive power, the present device being especially adapted to be operated by vacuum created by the engine operation.

A further object is to provide a construction which is self-contained, that is, has no external moving parts and wherein movement is produced by opposed pistons of bellows form, these pistons being operated by vacuum within the cylinders externally of the pistons with atmospheric pressure within the pistons which are alternately expanded and contracted longitudinally within the cylinders by application, alternately, of vacuum externally of the pistons.

A further object is to provide a device of this character which is so constructed as to eliminate the noise of operation, and prevent leakage and loss of vacuum, the bellows being so arranged as to provide sealing means to prevent loss of vacuum, and the noise of operation being eliminated by mounting the valve operating mechanism within the casing between the adjacent ends of the bellows. It is also an object to provide simple and quick acting valve mechanism whereby the valve is operated with a snap action to quickly shift the valve from one position to another and wherein this action is effected through the alternate movement of the bellows pistons.

A further object is to provide certain other new and useful features in the construction, arrangement and combination of parts, all as hereinafter more fully described, reference being had to the accompanying drawings in which Figure 1 is a longitudinal section substantially upon the line 1—1 of Fig. 3 of a device illustrative of an embodiment of the present invention;

Fig. 6 is a transverse section substantially upon the line 6—6 of Fig. 1 and drawn to a reduced scale.

Figures 1, 2:
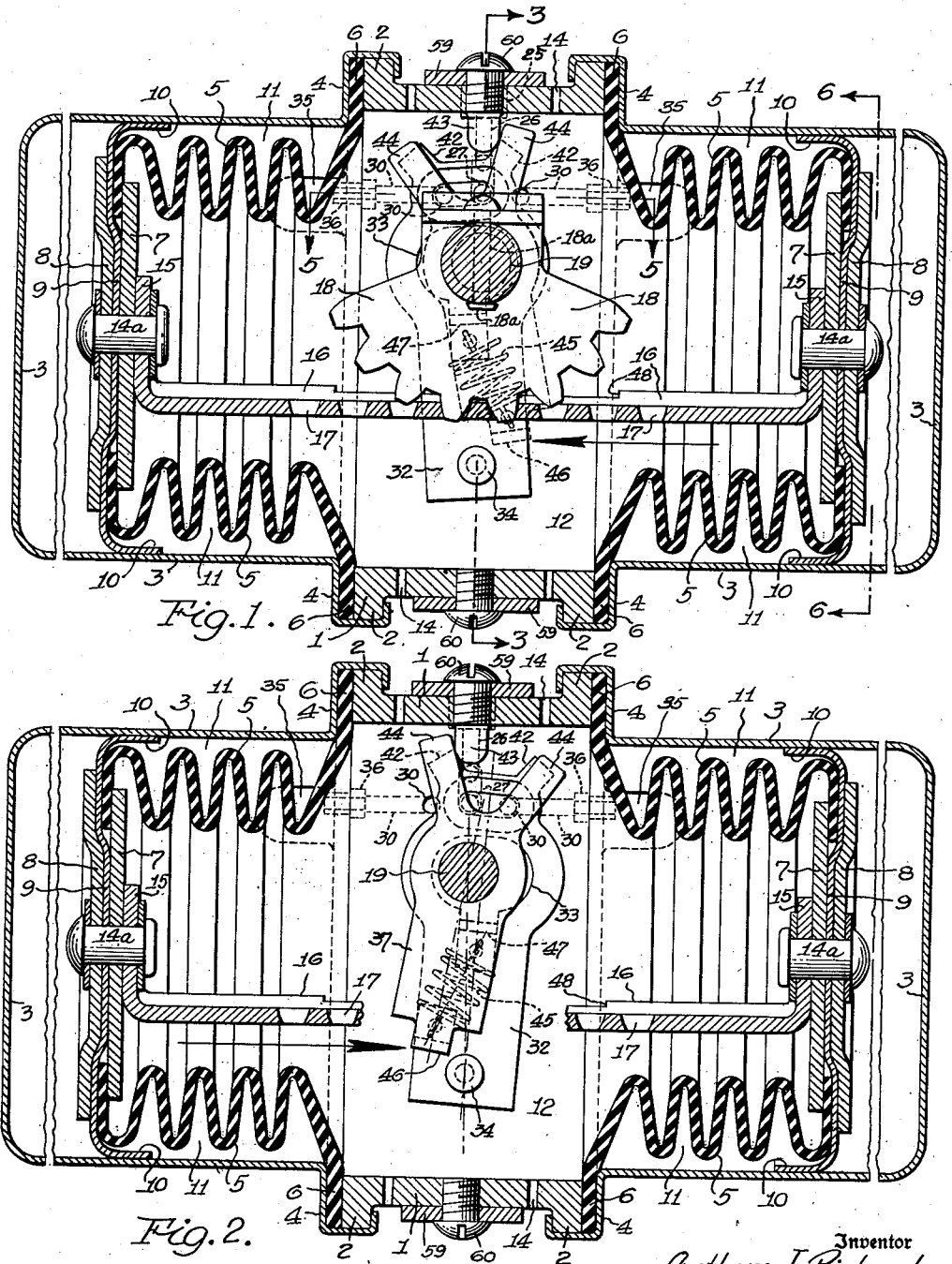
Fig. 2 is a similar section substantially upon the same line with the exception that this line passes laterally of the toothed sector which is shown in side elevation in Fig. 1 but which is not shown in Fig. 2, and wherein the valve operating mechanism is shown in full lines in Fig. 2 and in a different position from that in which it is indicated in Fig. 1.

As shown, the device comprises a suitable casing indicated as a whole by the numeral 1 and this case is formed with an outstanding annular rib 2 at each end. Sheet metal cylinders 3 are each formed up from a single sheet of metal with a continuous head or end and an outstanding flange 4 at the base or inner end of the cylinder. Each of these flanges is formed over a rib 2 on the case 1 to firmly attach the cylinders to the case in opposed relation to each other.

Within each cylinder 3 is a piston 5, each piston being formed of rubber or other flexible material laid in folds or corrugations to provide a bellows construction for ready expansion and contraction in the direction of the length of the piston. The inner or base end of each piston wall 5 is formed with an outwardly extending annular flange 6 which flanges are adapted to be interposed between the ribs 2 of the case 1 and the flanges 4 of the ends of the cylinders 3 so that each piston is firmly anchored at its inner or open end to an end of the case 1 and its flange 6 forms a seal to tightly close the inner ends of the cylinders 3, the edge portion of each flange 4 being formed over and turned inwardly against the inner sides of the ribs or flanges 2, thus compressing the rubber of the flanges 6 between the ends of the cylinders 3 and the ends of the case 1 to seal the piston and the cylinders against leakage.

The outer end of each bellows 5 is closed by a metal head comprising an inner metal disk 7, an outer disk 8 and an interposed sheet metal disk 9, the latter being formed with radially extending lugs 10 which are bent laterally and longitudinally of the cylinder wall to engage said wall and guide the piston within said cylinder. The disks 8 and 9 are offset inwardly from their peripheries to provide a space between the disk 9 and the disk 7 within which space the end edge portion of the rubber wall of the bellows is received to firmly secure the bellows to the piston head and prevent any leakage of air from the interior of the bellows to its exterior or into the chamber 11 within each cylinder exteriorly of the bellows piston. The chamber or space 12 within each bellows or the interior of each piston is in open communication with the chamber of the case 1, the wall of which case is provided with a plurality of openings 14 which are open to the outside atmosphere and therefore the interior of each bellows piston is under atmospheric pressure at all times. The disks 7, 8 and 9 forming the ends or heads of the bellows pistons are firmly clamped together by axial rivets 14a and these rivets also serve to rigidly secure the upwardly turned end portions 15 of a rack bar 16 to the piston heads. This rack bar 16 therefore rigidly connects the head ends of the two opposed bellows pistons and is formed intermediate its ends with a series of openings 17 to receive the teeth of a segmental gear 18 which is rigidly secured by a pin 18a to an operating shaft 19 mounted in suitable bearings in the opposed walls of the case 1, said shaft extending transversely of the case and of the rack bar 16 with one end of said shaft 19 projecting through its bearing member 20 in the wall of the case for the attachment thereto of a windshield wiper indicated at 21 in dotted lines in Fig. 3, this wiper being of the usual construction mounted upon an arm 22 having a head by means of which it is detachably and adjustably secured to the outer end of the shaft 19 in the usual manner, the end of the shaft being reduced in diameter and screw-threaded as at 23 and formed adjacent said screwthreaded end with a tapered and ribbed portion 24 to receive a similarly tapered and ribbed bore of the head of the arm 22, so that by placing the head of the wiper arm in engagement with the tapered end portion 24 of the shaft 19 and then applying a nut to the outer screwthreaded end 23 of the shaft, the wiper arm may be rigidly and adjustably secured to the outer end of the shaft.

Figure 3:
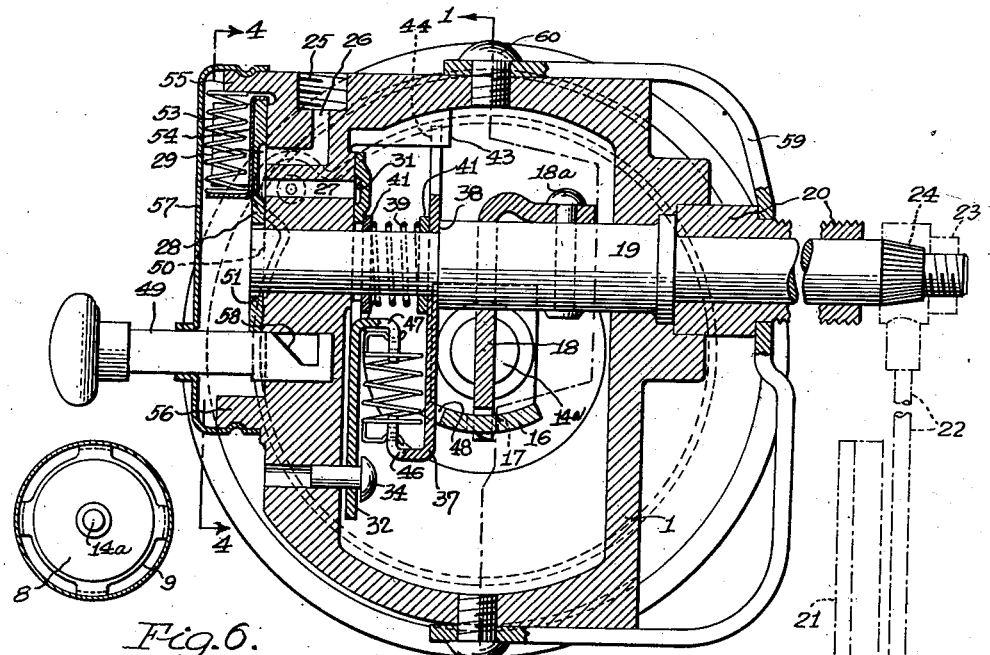
Fig. 3 is a transverse section substantially upon the line 3—3 of Fig. 1.

As shown in Fig. 3, the wall of the case 1 is formed with an opening 25 to receive the end of a tubular conduit not shown, which conduit leads to the intake manifold of the internal combustion engine so that a suction will be created through this conduit and through a passage 26 formed in the wall of the case and opening at one end into the bore 25 and at its opposite end through the outside surface of the wall of the case. This passage 26 is in open communication at its outer end with a passage 27 extending through the wall of the case, the communication between the outer end of these passages 26 and 27 being controlled by a slide valve or plate 28 resting against the outer surface of the case wall and provided with a depression or passage 29 adapted to afford communication between the passages 26 and 27 when the valve plate 28 is in raised position as shown in Fig. 3. The passage 27 opens at its inner end directly through the inner surface of the case wall and formed in this wall and opening through said inner surface thereof are two passages 30 spaced laterally from the passage 27 and adapted to communicate with said passage through a passage 31 formed in a valve plate 32 adapted to seat laterally against the inner surface of the case wall and cover the inner ends of the passages 27 and 30.

This valve plate 32 is formed with an elongated slot 33 through which the shaft 19 extends and said valve plate 32 is pivotally supported adjacent its lower end by means of a pivot pin 34 so that it may swing laterally in contact with the surface of the case wall and thus by such swinging movement laterally, bring the passage 27 into communication through the passage 31 with either one of the passages 30 which passages are extended in the case wall longitudinally of the structure and open at their outer ends into passages 35, each of which is in open communication at all times with the vacuum chamber 11 outside of each bellows piston, each passage 30 communicating at its outer end with one of the passages 35 through a suitable nipple or thimble 36 mounted in the end of the passage 30 and projecting through the flange 6 on the inner end of the rubber bellows 5.

Figure 5:
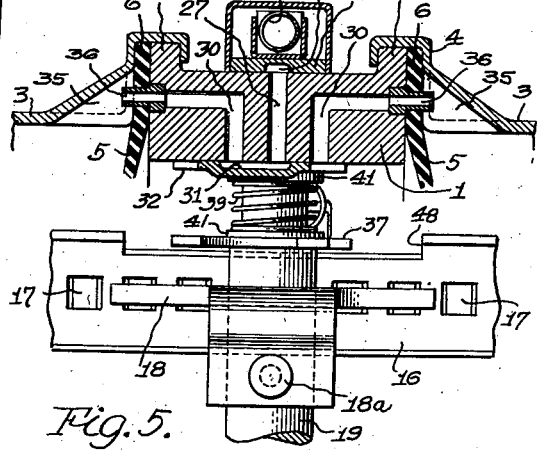
Fig. 5 is a sectional detail substantially upon the line 5—5 of Fig. 1.

Therefore when the valve slide 28 is in open position, that is, positioned with its passage 29 registering with the outer ends of the passages 26 and 27, engine operation will create a suction through these passages and through the passage 31 in the valve plate 32 and thence through one of the passages 30 and within one of the vacuum chambers 11 through the open passage 35, depending upon the position to which the valve plate 32 is swung, suction being created through the passages 27 and 30 to create a vacuum within the chamber 11 surrounding and at the end of the left hand piston within the left hand cylinder when the valve plate 32 is in the position shown in Figs. 1 and 5. When this valve plate is in this position, the inner end of the other passage 30 will be uncovered by the valve plate as shown in Fig. 5 and therefore the chamber outside of the right hand piston will be in open communication through this passage 30 with the chamber 13 of the case, which chamber is always under atmospheric pressure. Therefore swinging of the valve plate 32 from side to side will alternately place one of the bellows pistons externally, under vacuum and the other externally, under atmospheric pressure, thus causing the piston at one end to expand and the piston at the other end to contract, the two pistons being rigidly connected by means of the rack bar 16.

In this connection it will be noted that the portion of the vacuum chamber 11 which surrounds the bellows is in open communication with the portion of the chamber at the end of the piston through the spaces between the lugs 10 of the disk 9 which form the guides for the outer end of each piston and, therefore, full force and influence of the vacuum is applied to the piston to cause it to expand in a longitudinal direction. As vacuum force is applied exteriorly of the bellows wall of each piston and as the interior of each piston is subjected to atmospheric pressure, tendency of the bellows wall to collapse or to expand radially is obviated.

It is most desirable that the valve plate 32 be shifted from one position to another to alternate the action of vacuum upon the pistons with a quick snap action so that the direction of movement of the two bellows pistons and their connecting rack bar will be quickly reversed by a sudden movement of the valve as distinguished from a continuing movement, and to give such quick movement a valve operating plate 37 is pivotally supported upon the shaft 19 to turn freely upon said shaft but is frictionally held against a shoulder 38 of said shaft by means of a coiled spring 39 mounted upon said shaft between a pair of washers 41 one of which engages the side of the operating plate 37 and the other of which engages the inner side of the valve plate 32. This spring 39 thus exerts a limited force to hold the member 37 in contact with the shoulder 38 and to also hold the valve plate 32 in contact with the inner surface of the case wall. The swinging movement of the valve plate 32 is limited by means of lugs 42 projecting from its upper end to engage a stop lug 43 projecting inwardly from the upper inner face of the wall of the case 1. This valve plate is thus limited in its swinging movement to register its passage 31 with either one or the other of the passages 30. In a like manner, the valve control plate 37 is limited in its swinging, lateral movement upon the shaft 19 by means of upwardly extending arms 44 adapted to engage the stop lug 43, and interposed between the valve plate 32 and the valve control plate 37 is a coiled spring 45 under light compression, a seat for one end of said spring being provided adjacent the lower end of the valve control plate 37 and a similar seat for the other end of said spring being provided upon the valve plate 32 above the pivot 34 of said plate and below the shaft 19, said seats being provided by turning portions of these plates laterally to form ears 46 and 47 against which the ends of the spring 45 are seated. The lower end of the valve control plate 37 extends within an open slot 48 formed in one side of the rack bar 16 so that upon longitudinal movement of the rack bar in either direction one of the ends of the open slot 48 will come into contact with the lower end portion of the valve control plate 37 and thus swing said plate upon its pivotal support on the shaft 19.

Referring particularly to Fig. 2 of the drawings, it will be seen that the longitudinal axes of the shaft 19 and pivot pin 34 lie in the same vertical plane and that the open end of the passage 27 is also in this vertical plane. The valve control plate 37 is mounted to swing on the shaft 19 and the valve plate 32 is mounted to swing upon the pivot pin 34 with the passage 31 at its upper end positioned to register with the inner open end of the passage 27 so that upon lateral swinging movement of the plate 32 either one or the other of the passages 30 will be connected by the passage 31 in the valve plate with the passage 27. With the valve plate 32 and the valve control plate 37 in the relative positions shown in Fig. 2 and with the rack bar 16 moving in the direction of the arrow, the end of the slot 48 in said rack bar will come into engagement with the lower end of the control plate 37 and swing this plate independently of the valve plate 32, but as the spring 45 is connected or seated at its upper end upon the valve plate 32 and at its lower end upon the lower end portion of the control plate 37, as the control plates swing across the vertical plane of the longitudinal axes of the shaft 19 and pivot pin 34, this spring 45 will exert a force upon the valve plate 32 upwardly from its pivot 34 and as the lower end of said spring passes said vertical plane, the direction of the force of said spring will be shifted from one side of said vertical plane to the other and this force will quickly swing the valve plate 32 to the position shown in Fig. 1, with a quick snap-over action, such swinging movement being limited by the lugs 42 on the upper end of the valve plate and the swinging movement of the control plate 37 will be limited by the lugs 44 upon its upper end. Therefore upon movement of the rack bar in one direction, it will be brought into engagement with the control plate 37 and swing this plate in one direction to cause a quick shifting of the valve plate 32, and upon reversal of the action of vacuum upon the bellows by such shifting of the valve plate 32, the direction of movement of the rack bar 16 will be reversed and the opposite end of the open slot 48 therein will come into contact with the lower end of the valve control plate 37 and swing this plate in the opposite direction to shift the valve plate 32 and reverse to the direction of operation of the bellows pistons.

With this arrangement of valve operating mechanism, such mechanism may be entirely enclosed within the case 1 between the inner ends of the bellows 5, together with the rack bar 16 and segment 18, thus effectually eliminating noise of operation, and by the particular construction and arrangement of valve plate 32 and valve control member 37, with the compression spring acting between these members, a quick shifting movement of the valve is secured to reverse the direction of movement of the rack bar operated by the opposed bellows pistons to impart an oscillatory movement to the shaft 19 and the windshield wiper connected to its outer end.

Figure 4:
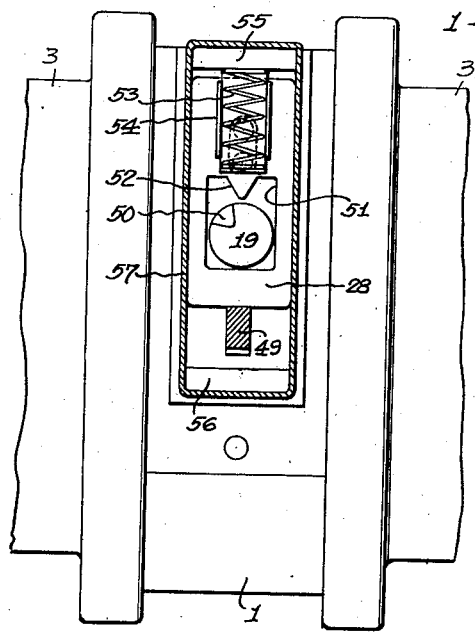
Fig. 4 is a sectional detail substantially upon the line 4—4 of Fig. 3.

The stopping and starting of the device is controlled by the valve slide 28, this slide being operated by means of a pull and push bar 49 having a bearing within the side wall of the case 1 directly below the end of the shaft 19 which projects a limited distance through this wall and is provided with a notch 50 in said end. The valve plate slide 28 is formed with an opening 51 through which the projecting end of the shaft 19 extends and this slide is also formed with a lug 52 projecting downwardly within the opening 51 to engage within the notch 50. The slide 28 is normally pressed downwardly with its lower end in contact with the bar 49 by means of a coiled spring 53, said spring being seated at its lower end upon a sheet metal bracket 54 secured to and carried by the upper end of the slide 28 and this spring is seated at its upper end against a lug 55 projecting from the side of the casing wall 1, and a similar lug 56 projects from said wall at a point below the pull and push bar 49. The slide 28 and its operating spring 53 are enclosed within a suitable sheet metal casing 57 and this casing has end flanges formed into engagement with said lugs 55 and 56 to firmly secure said casing in place. The pull and push bar 49 extends through an opening in the wall of the casing 57 and past the lower end of the slide 28 and into a bore in the wall of the case 1, which bore forms a bearing for the inner end of this bar 49, which end is formed with a notch 58 in its upper side into which notch the lower end of the slide 28 is adapted to drop when the bar is pulled outwardly. The pulling outwardly of the bar 49 permits the slide 28 to move downwardly and close off communication between the passages 26 and 27 this downward movement of the slide being effected by the spring 53, the lower end of the slide riding down the inclined outer end of the notch 58 until the lug 52 on the slide engages the shaft 19 and then, when the notch 50 in the end of the shaft comes opposite said lug, said lug will drop into the notch, completing the downward movement of the slide 28 and holding the shaft 19 in the position to which it has been turned. The notch 50 will be so positioned relative to the position of the wiper arm 22 on the shaft that the wiper will be held at one end of its stroke by the engagement of the lug 52 with the notch 50 in the end of the shaft. Preferably the outer end of the notch 58 will be inclined so that by an inward push on the bar 49 the slide 28 will be lifted against the action of the spring 53. Also the lug 52 and notch 50 are preferably of V- shape as shown in Fig. 4, so that when the wiper is inoperative, the wiper arm may be swung in either direction, manually, the shape of the lug and notch permitting rotation of the shaft 19 against the action of the spring 53. Also as shown, the spring 53 is preferably bowed intermediate its ends so that one side thereof will engage the outer wall of the enclosed casing 57 and said spring will therefore tend to force valve slide 28 laterally into face engagement with the outer surface of the wall of the casing 1 to prevent leakage past the slide.

Any suitable means may be provided for supporting the structure in operative position, the form of such supporting means being determined by the place of application of the device in use, but as shown in the accompanying drawings where the device is to be mounted upon the header of a windshield, such attaching support is provided by a bail 59 the ends of which are secured in any suitable manner, as by screw studs 60, to the upper and lower sides of the case 1, with said bail provided with an opening through which the screw-threaded end portion of the bearing member 20 projects, this bearing member being secured in any suitable manner within an opening in a header of the windshield.

Obviously changes may be made in the construction and arrangement of parts without departing from the spirit of the present invention and such changes are contemplated.

Having thus fully described my invention what I claim is:

1. In a windshield wiper motor operated from a source of suction, a hollow central casing with open ends, a pair of flexible-walled longitudinally-extended bellows with heads disposed outwardly in opposite directions and with open inner ends connected respectively to the open ends of said hollow central casing, means for continuously maintaining the interiors of said central casing and said bellows at atmospheric pressure, means operatively interconnecting the heads of said bellows for effecting simultaneous reciprocation thereof in the same direction, a pair of cylinders respectively enclosing said pair of bellows, a power output shaft to which a windshield wiper is adapted to be connected, mechanism operatively connecting said head-interconnecting means with said output shaft for transmitting the motion of said bellows thereto, and means operatively connected to said mechanism and responsive to the reciprocation of said bellows for selectively valving each of said cylinders alternately to atmospheric pressure and to said source of suction respectively, said valving means and said mechanism being disposed substantially entirely within the interiors of said central casing and said pair of bellows, whereby said bellows and said cylinders form with said casing a double-walled chamber adapted to muffle the operating noise of said valving means and said mechanism contained therein.

2. In a windshield wiper motor operated from a source of suction, a hollow central casing with open ends, a pair of flexible-walled longitudinally-extended bellows with heads disposed outwardly in opposite directions and with open inner ends connected respectively to the open ends of said hollow central casing, means for continuously maintaining the interiors of said central casing and said bellows at atmospheric pressure, means operatively interconnecting the heads of said bellows for effecting simultaneous reciprocation thereof in the same direction, a pair of cylinders respectively enclosing said pair of bellows, a power output shaft to which a windshield wiper is adapted to be connected, mechanism operatively connecting said head-interconnecting means with said output shaft for transmitting the motion of said bellows thereto, means operatively connected to said mechanism and responsive to the reciprocation of said bellows for selectively valving each of said cylinders alternately to atmospheric pressure and to said source of suction respectively, said valving means and said mechanism being disposed substantially entirely within the interiors of said central casing and said pair of bellows, whereby said bellows and said cylinders form with said casing a double-walled chamber adapted to muffle the operating noise of said valving means and said mechanism contained therein, the sides of each bellows being spaced apart from the adjacent cylinder wall by a substantial clearance, and spaced guide members connected to said bellows and extending across said clearances into guiding engagement with said cylinder walls.

3. A device for the purpose described including a central casing providing a chamber and having a wall formed with air passages certain of which open through the opposite faces of the wall, opposed cylinders secured to opposite sides of the casing, a bellows within each cylinder having a flexible circumferential wall with said flexible walls spaced from the walls of the cylinders to form a vacuum chamber in each cylinder between said cylinder and its bellows, said flexible wall of each bellows being extended at its inner end to close the inner end of each vacuum chamber in each cylinder, certain of the passages in the wall of the casing opening into said vacuum chambers to permit the withdrawal of air therefrom, a valve plate within the casing in engagement with the inner face of the wall thereof to control communication between the passages in the wall, a control member within the casing and operatively connected with said valve plate to move the same upon movement of said control member, means secured to and movable with said both bellows and connecting the same for simultaneous movement, said means extending through the chamber of the casing and adapted to engage and move said control member upon movement of said bellows in either direction, means within the chamber of the casing for transmitting motion from said means connecting said bellows, a valve slide to engage the outer surface of the wall of the casing and formed to provide communication between certain of the passages opening through the wall surface, a casing for enclosing said slide, a coiled spring within said latter casing for moving said slide in one direction, and a pull and push bar extending across said latter casing in contact with which said slide is held by said spring, said bar being formed with a notch into which said slide is adapted to drop when said bar is manually moved to bring said notch opposite the lower end of said slide.

ARTHUR J. RICHARDS.